March 14, 1933.  A. L. FREEDLANDER  1,901,442
PROCESS FOR MANUFACTURING BELTS
Filed April 16, 1931   2 Sheets-Sheet 1
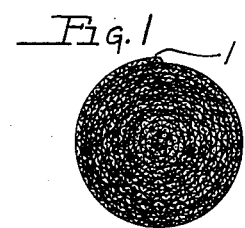
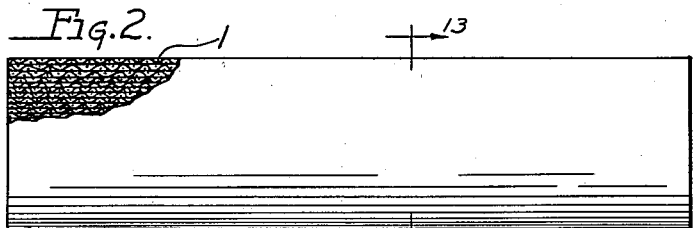
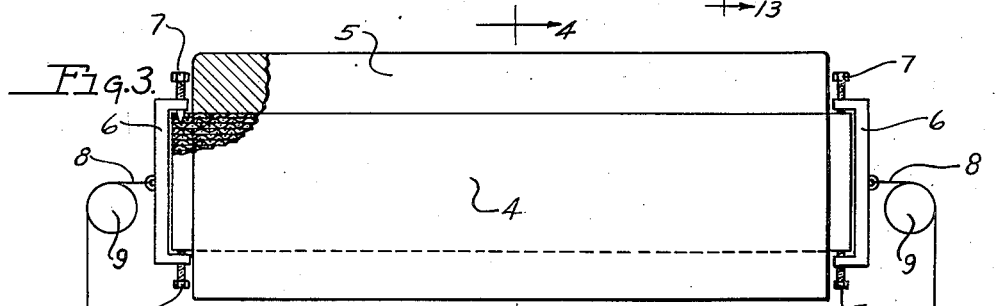
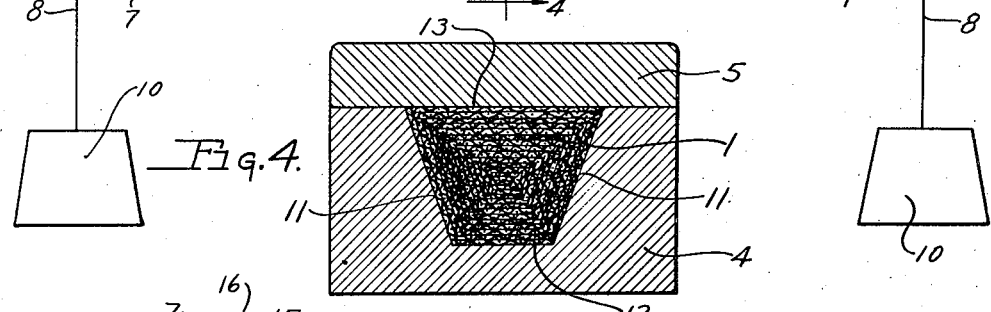
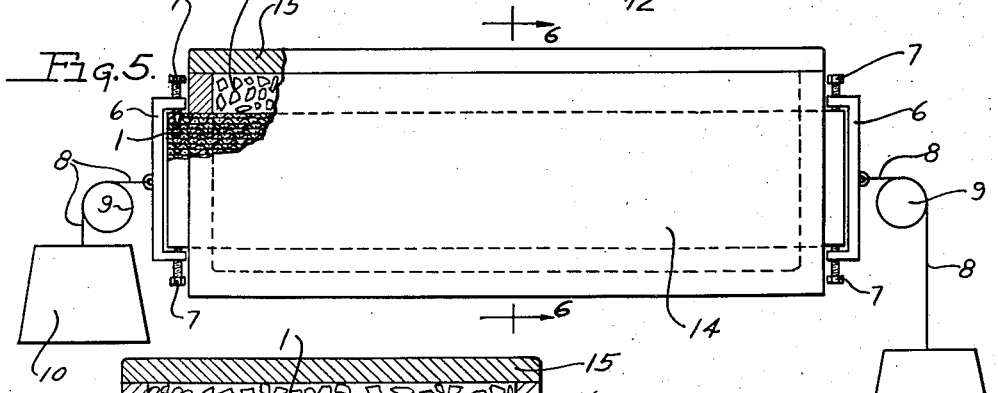
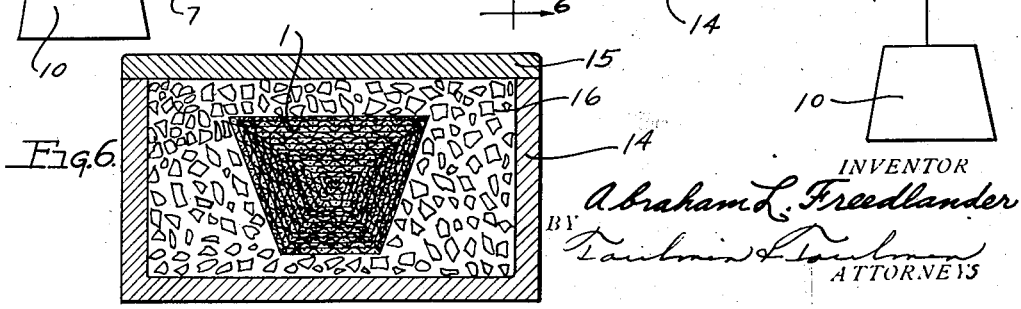
INVENTOR
Abraham L. Freedlander
BY Toulmin & Toulmin
ATTORNEYS March 14, 1933. A. L. FREEDLANDER 1,901,442
PROCESS FOR MANUFACTURING BELTS
Filed April 16, 1931  2 Sheets-Sheet 2
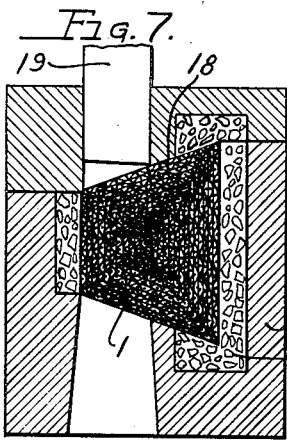
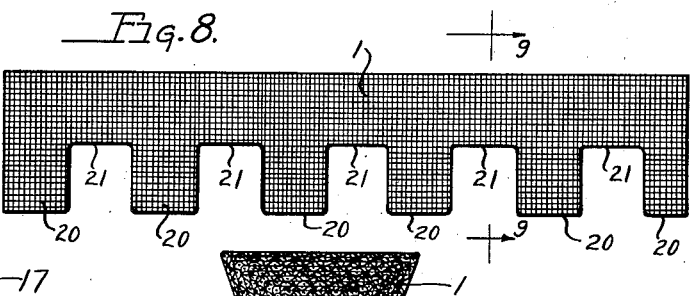
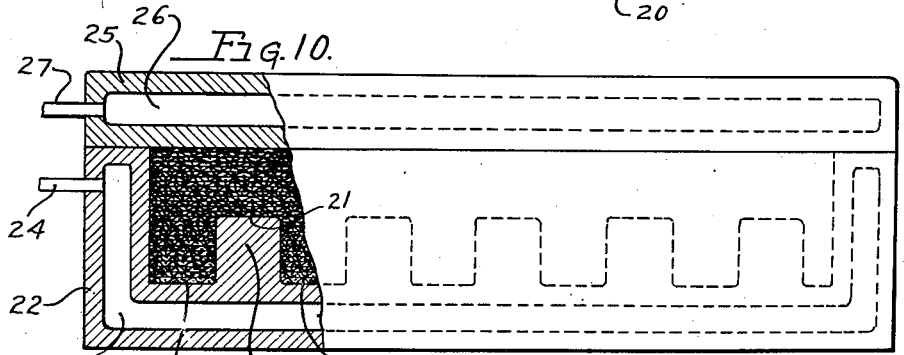
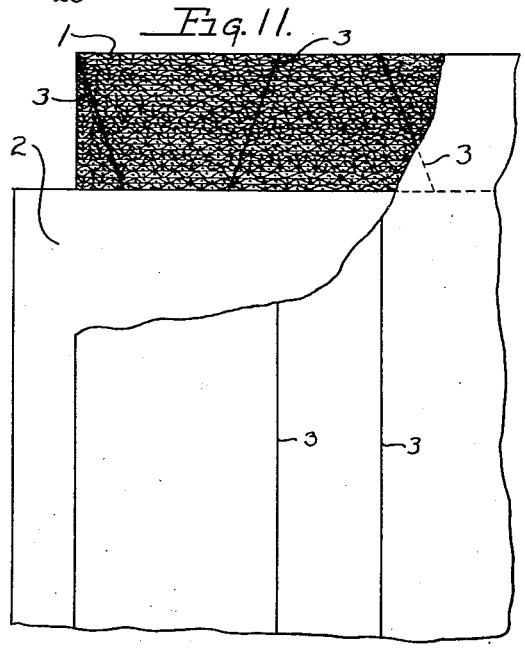
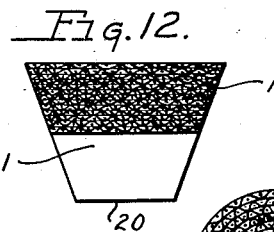
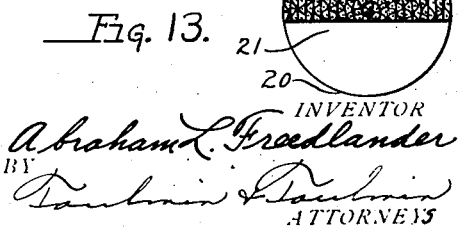
INVENTOR
Abraham L. Freedlander
BY
ATTORNEYS Patented Mar. 14, 1933

1,901,442

UNITED STATES PATENT OFFICE

ABRAHAM L. FREEDLANDER, OF DAYTON, OHIO

PROCESS FOR MANUFACTURING BELTS

Application filed April 16, 1931. Serial No. 530,535.

My invention relates to a process and apparatus for practicing the process of manufacturing belts, and particularly cog belts.

It is the object of my invention to provide a cheap and extremely accurate method of producing a molded cut cog trapezoid driving belt, although my method is adapted to the production of various forms of belts no matter what the shape of the cross section thereof.

Referring to the drawings:

Figure 1 is an end elevation of the belt as initially formed of rubberized fabric;

Figure 2 is a side elevation thereof;

Figure 3 is a side elevation, partially in section, showing the typical form of stretching mechanism for prestretching the belt material prior to vulcanization;

Figure 4 is a section on the line 4—4 thereof showing the prestretching mechanism which is also utilized as a mold for giving the proper configuration to the cross section of the belt;

Figure 5 is a side elevation partially in section of the apparatus used to chill and freeze the belt in its stretched condition;

Figure 6 is a section on the line 6—6 thereof;

Figure 7 is a diagrammatic section through the supporting die mechanism and punch guide with the punch in elevation showing the punching of the belt to sever portions thereof to form teeth in the belt;

Figure 8 is a side elevation of the belt after the teeth have been formed;

Figure 9 is a section therethrough;

Figure 10 is a side elevation partially in section showing the vulcanizer for the belt to vulcanize it after the proper cross section and teeth arrangement have been provided;

Figure 11 shows an alternate form of forming the belt material by arranging it in concentric layers upon a mandrel, the belt material being shown partially in section with the lines of severance of the belt material to form belts being indicated;

Figure 12 is section through the belt after teeth have been cut in it;

Figure 13 is a section through the rope form of belt shown in Figures 1 and 2 on the line 13—13 after the belt has been carried through the method taught herein and after the teeth have been severed from it.

Referring to the drawings in detail and the details of my method of producing a belt, my method consists of the following steps, of which a part or all of the steps may be employed, depending upon the particular results desired and the type of belt it is desired to secure:

1. Forming the belt material by either rolling it or winding it to form a compact mass of textile and rubber in unvulcanized condition;

2. Stretchng the unvulcanized material to take out a predetermined percentage of stretching;

3. Forming the stretched material simultaneously with the previous step or successively thereto or previous to the previous step into a belt of predetermined configuration;

4. Maintaining the preformed, prestretched belt in the condition of prestretching and preforming and freezing preferably reducing the temperature to approximately fifty below zero;

5. Placing the belt in its frozen preformed condition into a supporting die of similar form and shearing therefrom portions of the belt to form a cog belt so as to permit the belt to pass over small pulleys and short center drives without buckling, rippling or distortion; and 6. Placing the sheared, preformed cog belt within a vulcanizer having the same internal form as the belt and vulcanizing it.

It will be realized that in the practice of my method the belt material generally designated 1 consisting of a woven textile material or any other suitable form of textile material, preferably impregnated with rubber, may be wound in a sausage form or roll, as in Figures 1 and 2. It may be used in that form eventually without further modification of its cross section when it is to be used as a driving rope.

In the event the belt is to be used as a V-belt drive it is molded into the proper trapezoid as indicated in Figures 4, 6, 7 and 9 when it is developed from a roll, such as in Figures 1 and 2, or the fabric 1 may be wound concentrically upon a mandrel 2, as in Figure 11 and then severed along the lines 3 into suitable trapezoid form whereupon the steps of prestretching, freezing, shearing and vulcanizing may be executed.

Prior to vulcanization and freezing, it will be understood that the belt material impregnated with the rubber is adhesive and sticky and will tend to maintain its general form and shape during handling by reason of this characteristic.

The roll of material shown in Figures 1 and 2 and the material shown in Figure 11 is placed within a combined former and stretcher casing having a bottom portion 4 and a top portion 5. The ends of the belt material are engaged by a clamp 6 having detaching screws 7 to which is connected a cable 8 passing over the pulley 9.

The cable is attached to the weight 10. Such equipment is mounted on either end of the belt and a predetermined stretch is taken out of the belt.

It will be understood that this arrangement as illustrated and described is purely diagrammatic and shows a typical mechanism. I am using this disclosure because of its simplicity. Any means or method of stretching the belt equivalent thereto can be employed.

If it is desired to mold the belt simultaneously to its proper form, the lower half of the mold is provided with a space that is trapezoid in section, as indicated in Figure 4 having side walls 11, a bottom 12 and a top formed at 13 by the cover 5.

I then take the belt in its prestretched form and quickly freeze it by placing it in the container 14 having the top 15 where it is packed preferably in solidified carbon dioxide, known as dry ice. This reduces the belt to a temperature of approximately 50 degrees below zero Fahrenheit. I prefer to maintian it in its prestretched condition by using the same stretching mechanism.

If desired, a container 14 may be employed having a form conforming to the cross section of the belt and chambers for containing cooling medium, such as brine or any refrigerant, as I do not desire to confine myself to any particular refrigerant, although I have found solidified carbon dioxide as the most desirable, both in point of view of speed temperature and ease of handling that can be employed.

I then place the frozen belt in its prestretched and preformed condition in a die 17 of similar form in which it is held by a punch guide 18, and then shear the belt while still frozen and, therefore, in its predetermined prestretched condition in cross section by the shear 19 to form the teeth 20 by reason of the removal of portions of the very rigid belt in its frozen condition as at 21.

The punch guide and die support may be provided with chambers for circulation of chilling liquid or the retention of dry ice, but I have not found that necessary.

When the belt has been thus brought to its predetermined condition of stretch, cross section and tooth formation, I place it within a vulcanizer having a similar internal configuration. The lower half of this vulcanizer is designated 22 having a steam chamber 23 fed by the pipe 24 and a cover 25 having a steam chamber 26 fed by the pipe 27.

The belt is then retained by the cog projections 28 projecting into the cut away spaces 21 in its stretched preformed cog condition so that the cogs are accurate and the length of the belt is predetermined and maintained in this predetermined condition, whereupon the belt is vulcanized so that it retains its length and shape.

It will be understood that the form shown in Figures 1 and 2 is for an end belt and the form shown in Figure 11 may be employed for an endless belt or an end belt. By an "end" belt I means one that has free ends which are connected together by some form of connector to form a continuous belt.

It will be understood that I desire to comprehend within my invention such modifications as may be necessary to adapt it to varying conditions and uses.

Having thus fully described my invention, what I claim as new and desire to secure by Letters Patent, is:

1. In a method of manufacturing a driving belt, superimposing a plurality of layers of rubberized fabric, stretching said layers of fabric, freezing the layers of fabric in prestretched, superimposed condition, and shearing portions therefrom while frozen.

2. In a method of manufacturing a driving belt, superimposing a plurality of layers of rubberized fabric, stretching said layers of fabric, freezing the layers of fabric in prestretched, superimposed condition, shearing portions therefrom while frozen, and vulcanizing the belt so formed.

3. In a method of manufacturing a belt, superimposing a plurality of layers of rubberized fabric, stretching said body of rubberized fabric, molding said body to a predetermined cross section, freezing said body, and shearing portions from said body while still in frozen condition.

4. In a method of manufacturing a belt, superimposing a plurality of layers of rubberized fabric, stretching said body of rubberized fabric, molding said body to a predetermined cross section, freezing said body, and shearing portions from said body while still in frozen condition, and vulcanizing said body.

5. In a method of manufacturing a belt, superimposing a plurality of rubberized layers of textile material, forming said material into a body of predetermined cross section, freezing said body, and shearing portions from said body while frozen.

6. In a method of manufacturing a belt, superimposing a plurality of rubberized layers of textile material, forming said material into a body of predetermined cross section, freezing said body, shearing portions from said body while frozen, and vulcanizing said body.

7. In a method of making a belt, rubberizing a strip of fabric, winding said fabric so that a plurality of layers are arranged one on the other progressively from the center outwardly to form a rope of substantially circular cross section, forming said rope into a trapezoid section, freezing the material when in said trapezoid section and shearing portions from said trapezoid section to form a toothed belt.

8. In a method of making a belt, rubberizing a strip of fabric, winding said fabric so that a plurality of layers are arranged one on the other progressively from the center outwardly to form a rope of substantially circular cross section, forming said rope into a trapezoid section, freezing the material when in said trapezoid section and shearing portions from said trapezoid section to form a toothed belt, and vulcanizing said belt.

9. In a method of making a belt, rolling a strip of rubberized fabric upon itself to form a rope, stretching said rope, molding said rope to a trapezoid section, freezing said rope, shearing portions from said rope while in frozen trapezoid section, maintaining said rope in trapezoid form, and vulcanizing while in said condition.

10. In a method of manufacturing a belt, winding a strip of rubberized fabric upon a mandrel to form concentric layers, cutting said layers in predetermined form to form belts, stretching said layers as a body equally, freezing said belt, and shearing portions from said belt.

11. In a method of manufacturing a belt, winding a strip of rubberized fabric upon a mandrel to form concentric layers, cutting said layers in predetermined form to form belts, stretching said layers as a body equally, freezing said belt, shearing portions from said belt, and vulcanizing the belt while maintaining it in its predetermined form and condition of stretch.

12. In a method of forming a belt, superimposing a plurality of rubberized layers of textile material, streching said material into a body of predetermined cross section, applying solidified carbon dioxide thereto until reduced to a rigid condition, and shearing portions therefrom.

13. In combination in a belt, superimposing in tight engagement with one another a plurality of layers of rubberized textile material, stretching and forming into predetermined cross section, freezing while in said condition by imbedding in solidified carbon dioxide, and reducing the temperature to approximately fifty degrees below zero Fahrenheit, and shearing while at approximately that temperature to remove portions of the belt structure therefrom.

14. In a method of manufacturing a belt, forming a belt in a prestretched condition on a form and stretching it while so forming it, freezing it while so formed and stretched, and vulcanizing it in its frozen stretched condition before it can thaw.

15. In a method of manufacturing a belt, winding belt materials in streched condition on a form and thereby stretching the materials, freezing the stretched formed belt, removing the belt in stretched formed frozen condition, placing the belt while frozen in a vulcanzing mold, and vulcanizing it.

16. In a method of manufacturing a belt, forming a belt on a form in stretched condition, spraying it with carbon dioxide to freeze it, removing it while frozen, and vulcanizing it.

17. In a method of forming a belt, stretching a belt, freezing it while stretched before removing it from the means stretching it, and vulcanizing it while it is still frozen.

18. In a method of forming a belt, winding concentric layers of textile material and rubber on a drum, applying said mateirals on the drum under tension to stretch them, freezing said material while on the drum, severing the material into belts, and vulcanizing the belts while still frozen and stretched.

19. In a method of manufacturing a belt, molding a belt to a predetermined cross section, stretching it, freezing it while stretched, and vulcanizing it while frozen in stretched condition.

In testimony whereof I affix my signature.
ABRAHAM L. FREEDLANDER.